United States Patent [19]

Murakami

[11] 4,406,427
[45] Sep. 27, 1983

[54] CLUTCH MECHANISM FOR USE IN FISHING REELS

[75] Inventor: Hideo Murakami, Fuchu, Japan

[73] Assignee: Ryobi Limited, Hiroshima, Japan

[21] Appl. No.: 219,486

[22] Filed: Dec. 23, 1980

[30] Foreign Application Priority Data

Dec. 28, 1979 [JP] Japan .......................... 54-182983[U]

[51] Int. Cl.³ ............................................. A01K 89/02
[52] U.S. Cl. ..................................... 242/218; 242/220
[58] Field of Search ................. 242/84.21 R, 211–221

[56] References Cited

U.S. PATENT DOCUMENTS

| | | | |
|---|---|---|---|
| 1,939,148 | 12/1933 | Spenny | 242/220 |
| 2,652,991 | 9/1953 | Murvale | 242/220 |
| 4,014,422 | 3/1977 | Morshita | 242/212 |
| 4,281,808 | 8/1981 | Noda | 242/218 |

Primary Examiner—Billy S. Taylor
Attorney, Agent, or Firm—Birch, Stewart, Kolasch & Birch

[57] ABSTRACT

In a clutch mechanism for use in a fishing reel of the type wherein a pinion is coupled with or disconnected from a spool shaft by a clutch cam and a clutch bar so as to transmit or interrupt torque applied by an operating handle to the spool shaft. A kick lever is provided which is pivotally mounted on a cover of the clutch mechanism and operated by a push button, a slider pivotally connected to the kick lever, and a pawl pivotally mounted on the slider to engage and disengage a ratchet which is mounted on the cover. The pawl is maintained by a spring at a position slightly displaced from a line interconnecting an axis of the ratchet wheel and a center of rotation of the pawl thus avoiding arresting of the pawl by a tooth of the ratchet wheel.

4 Claims, 4 Drawing Figures

4,406,427

CLUTCH MECHANISM FOR USE IN FISHING REELS

BACKGROUND OF THE INVENTION

This invention relates to a clutch mechanism capable of transmitting and interrupting the torque applied to a reel by an operating handle and capable of automatically establishing a torque transmitting state by a foreward rotation of the handle to wind a fishing line.

The prior art clutch mechanism comprises a gear rotated by a handle, a pinion meshing with the gear and fitted on a spool shaft to be rotatably and axially slidable to engage a coupling of the spool shaft to rotate therewith, a clutch lever to shift the pinion in the axial direction, and a clutch cam operated by an operating lever and disposed between the clutch lever and a supporting plate whereby the coupling between the pinion and the spool shaft is released by the clutch cam, and the pinion and the spool shaft are coupled together by a ratchet wheel.

The clutch mechanism further comprises a kick pawl which is caused to engage the teeth of a ratchet wheel to interrupt transmission of the torque. However since the pawl engages the ratchet wheel at a point on a line interconnecting the axis of the ratchet wheel and the center of swinging of the pawl, the kick pawl collides upon the tips of the teeth thus failing to satisfactory engage the ratchet wheel which in turn renders inoperative the clutch mechanism.

The probability of the collision of the pawl against the teeth tips is proportional to the number of the ratchet wheel teeth so that in the conventional clutch mechanism, the number of the teeth is decreased to decrease the probability of the collision. This requires a large degree of rotation of the handle at the time of switching from interruption to transmission of the torque which slows down the speed of switching thus hampering an individual's fishing ability.

SUMMARY OF THE INVENTION

It is an object of this invention to provide an improved clutch mechanism for use in a fishing reel capable of positively engaging a clutch pawl with a ratchet wheel.

Another object of this invention is to increase the number of the teeth of the ratchet wheel thus rapidly switching the states of transmitting and interrupting the torque applied to a spool shaft from an operating handle.

According to this invention, there is provided a clutch mechanism for use in a fishing reel of the type wherein a pinion is coupled with or disconnected from a spool shaft by a clutch cam and a clutch bar so as to transmit or interrupt transmission of a torque of an operating handle to the spool shaft, characterized by a kick lever with one end pivotally connected to a cover of the clutch mechanism so that the kick lever is rotatable when the clutch cam is rotated, and a slider pivotally mounted on the kick lever by a pivot pin, the slider being provided with a lug. In addition, a kick pawl is pivotally mounted on the slider to engage a ratchet wheel supported by the cover, spring means are provided for urging the kick pawl to engage the lug, and a guide rod is secured to the cover, the slider being rotatable about the pivot pin while always engaging the periphery of the guide rod, thereby causing the pawl to engage the ratchet wheel at a position slightly displaced from a line interconnecting an axis of the ratchet wheel and a center of rotation of the kick pawl.

DESCRIPTION OF THE PREFERRED EMBODIMENT

Figure 1:
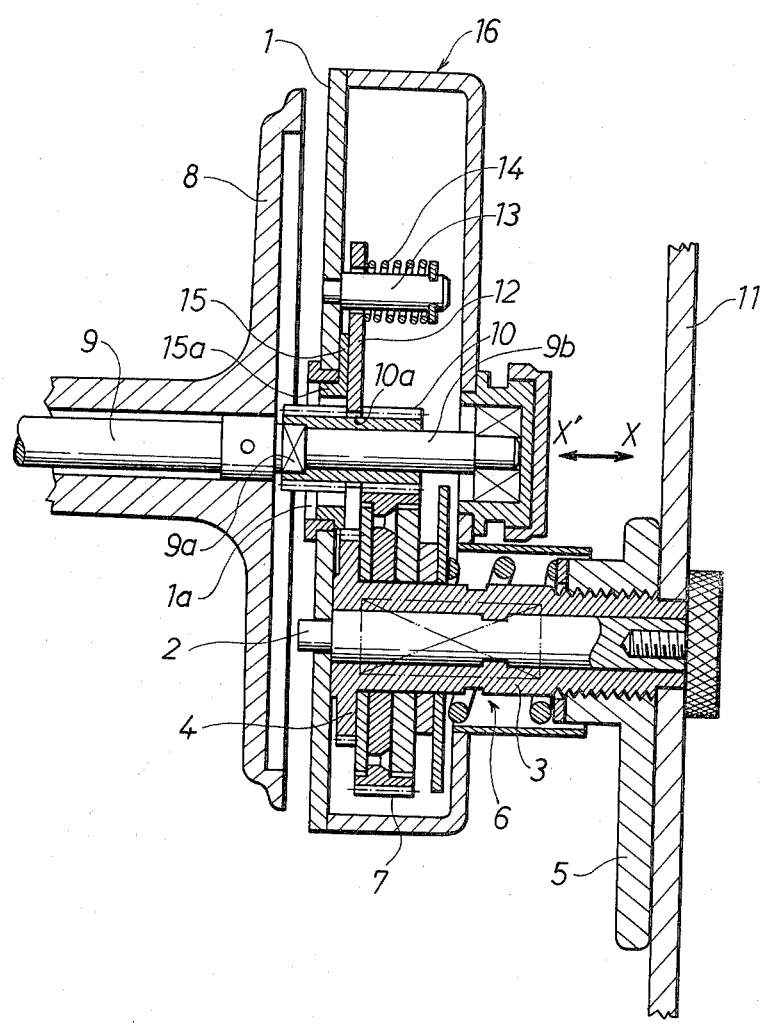
FIG. 1 is a longitudinal sectional view showing a torque transmitting mechanism between a handle and a spool of a fishing reel and a clutch mechanism embodying the invention.
Figure 2:
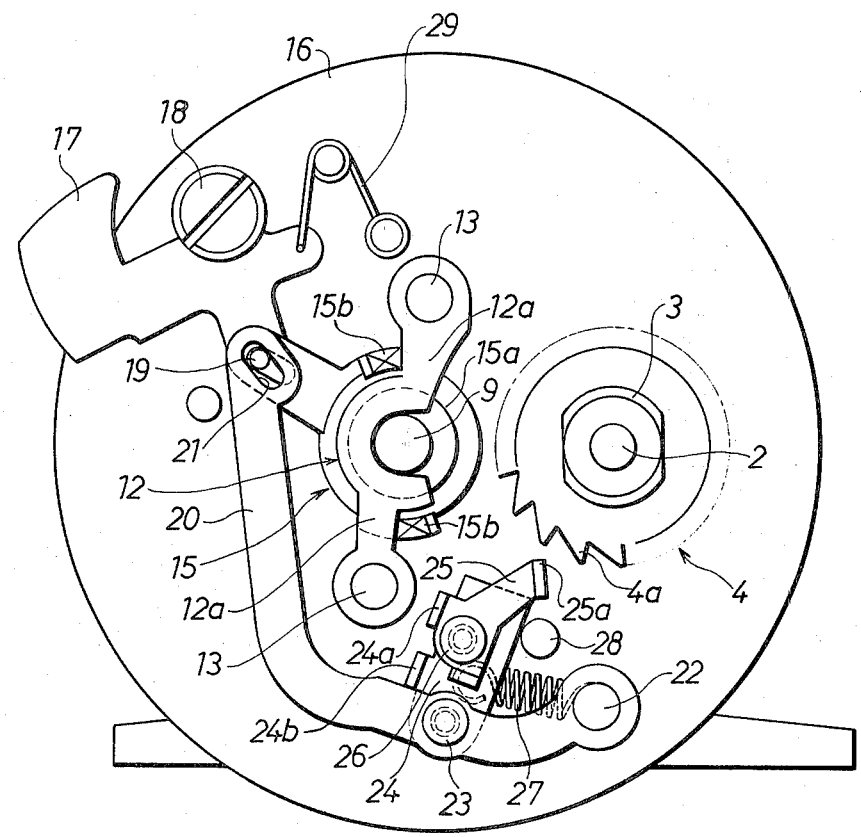
FIGS. 2 and 3 are side views of the clutch mechanism at the transmission and interruption states respectively.
Figure 3:
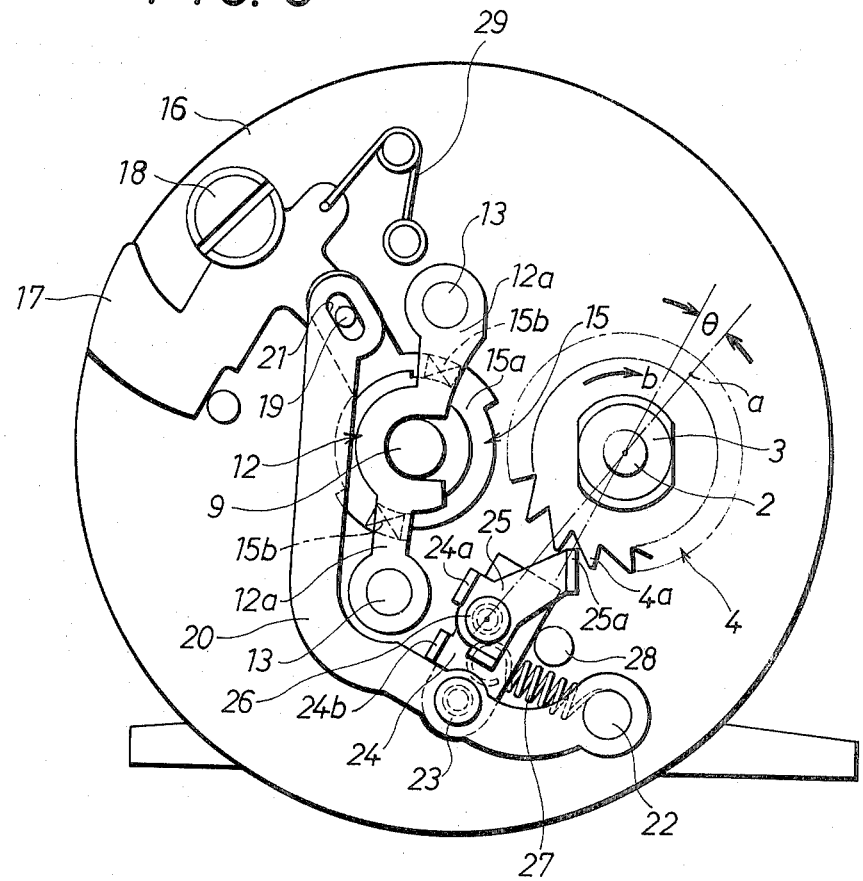

As shown in FIG. 1 the clutch mechanism embodying the invention comprises a ratchet shaft 3 with one end 2 supported by an inner plate 1 of the fishing reel. A ratchet wheel 4 is mounted on the inner end of the ratchet shaft 3, and a drag star handle 5 is threaded on the outer end of the ratchet shaft 3. A gear 7 mounted on the drag shaft 3 and urged by a drag mechanism is interposed between the gear 7 and the drag star handle 5. A pinion 10 meshing with the gear 7 and slidably mounted on a portion 9b spool shaft 9 supporting a spool 8, and a coupling 9a is located between the spool shaft 9 and the portion 9b thereof. The clutch mechanism for use in a fishing reel provided with the torque transmitting mechanism described above is constructed as follows: as shown in FIGS. 1-3, a clutch bar 12 is fitted in an annular recess 10a of the pinion 10 and a pin 13 secured to the inner surface of the plate 1 is surrounded by a coil spring 14 so as to urge the clutch lever 12 in the axial direction along the portion 9b of the spool shaft 9. A clutch cam 15 is interposed between the inner plate 1 and the clutch lever 12 with its boss 15a received in an opening 1a of the inner plate 1, which also receives the pinion 10. As best shown in FIGS. 2 and 3, a push button 17 is pivotally secured to a cover 16 secured to the inner plate 1 by a stepped screw 18. The clutch cam 15 and the upper end of an L shaped kick lever 20 are loosely connected to one arm of the push button 17 through a pin 19 and slot 21 connection. The lower end of the kick lever 20 is pivotally connected to the cover 16 through a pin 22 so that when the push button 17 is depressed the clutch cam 15 is rotated in the clockwise direction while at the same time the kick lever 20 is also rotated about the pin 22 in the same direction. A pin 23 is secured at an intermediate point of the kick lever 20 to support a slider 24 to be swingably mounted. The base of a kick pawl 25 adapted to engage the teeth 4a of the ratchet wheel 4 is pivotally connected to the slider 24 by a pin 26. A compression spring 27 is interposed between the pin 22 and the base of the pawl 25 so as to normally urge the base of the pawl against a lug 24a of the slider 24. For this reason, the slider 24 is normally urged to engage a guide rod 28 secured to the cover 16. Thus, the slider 24 is moved by the kick lever 20 along the inner surface of the cover 16.

The slider 24 is constructed such that it can rotate towards a position in which another lug portion 24b on one side of the slider engages the upper edge of the kick lever 20. The relative position of the ratchet wheel 4 and the kick pawl 25 is preset such that the tip 25a of the kick pawl 25 is displaced by an angle $\theta$ from a line a interconnecting the axis of rotation of the kick pawl that is the center of pin 25 and the axis of the shaft 3 of the ratchet wheel 4 (see FIG. 3).

Figure 4:
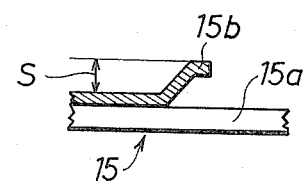
FIG. 4 is a side view showing a cam utilized in the clutch mechanism.

As shown in FIG. 4, the clutch cam 15 is provided with inclined cam portions 15b displaced from the main body of the clutch cam by an amount S substantially larger than the coupling length of the pinion 10 with respect to the coupling 9a. The clutch bar 12 is provided with symmetrically projecting arms 12a.

In FIG. 2, the cam portions 15b of the clutch cam 15 are shown disengaged from the arms 12a of the clutch bar 12, that is in the torque transmitting position shown in FIG. 1 so that the torque of the handle 11 is transmitted to the spool 8 to take up the fishing line.

When the push button 17 is depressed to move various elements to the position shown in FIG. 3, the clutch cam 15 is rotated to the position shown in FIG. 3. As a consequence, the cam portions 15b of the clutch cam 15 engages the arms 12a of the stationary clutch bar 12 to lie beneath the arms because of the inclination of the cam portions 15b. Consequently, the clutch bar 12 is moved in the direction of X shown in FIG. 1 together with the pinion 10 against the force of the spring 14. The amount of this axial movement is determined by the amount of deflection S of the cam portions 15b so that the coupling 9a between the pinion 10 and the spool shaft 9 is disengaged and the torque of the handle 11 merely rotates the pinion 10 through the gear 7 and would not be transmitted to the spool shaft 9.

Thus, the clutch mechanism is brought to an off state not to transmit the torque. As a consequence, when tension is applied to a fishing line, the spool 8 rotates in the reverse direction to pay out the line. This off state is maintained by the spring 14 which urges the clutch bar 12 against the cam portions 15b of the cam 15.

According to the clutch mechanism embodying the invention when the clutch mechanism is switched from the torque transmitting state to the interrupting state, the kick lever 20 is rotated about pin 22 in synchronism with the rotation of the clutch cam 15 to the position shown in FIG. 3 so that the slider 24 rotates in the clockwise direction to the position shown in FIG. 3 together with the kick pawl 25 by being guided by the peripheral surface of the rod 28.

Consequently, the tip 25a of the kick pawl 25 is moved to a position slightly apart from the line a from the position shown in FIG. 2 at which the tip 25a opposes the tip of a ratchet tooth 4a as the slider 24 and the kick pawl 25 rotate in the clockwise direction. During this rotation, the tip 25a of the pawl 25 may collide against or be arrested by the tip of the tooth, but since the tip 25a is displaced from the line a, it can readily swing in the clockwise direction to positively engage the ratchet tooth 4a.

Subsequently, when the handle 11 is rotated in the forward direction from the position not to transmit the torque to rotate the ratchet wheel 4 in the direction of b shown in FIG. 3, the tip 25a of the kick pawl 25 is pushed by the inclined side surface of the tooth 4a so that the kick pawl 25 is smoothly pushed by the tooth 4a so that the kick pawl 25 and the slider 24 are rotated away from the ratchet wheel 4. As a consequence, the kick lever 20 is rotated about the pin 22 in the counterclockwise direction, and the clutch cam 15 is rotated about the pin 22 in the counterclockwise direction to move the cam portions 15b away from beneath of the arms 12a of the clutch bar 12. At the same time, the clutch bar 12 is moved in the direction X' shown in FIG. 1 by the force of the spring 14 so that the pinion 10 is moved towards the left to be connected with the spool shaft 9 by the coupling 9a to automatically return to the torque transmission state.

As shown in FIGS. 2 and 3 a hair pin spring 29 is provided for the push button 17 to urge the same to the torque transmitting state.

As above described, according to the clutch mechanism of this invention, the pinion 10 is moved by the clutch cam 15 and the clutch bar 12 to be connected to or disconnected from the sleeve shaft 9 through the coupling 9a so as to transmit or interrupt the torque to the sleeve shaft 9 applied by the operating handle 11. Further, the slider 24 carrying the kick pawl 25 is pivotally connected to the kick lever 20 hinged to the cover 16 so as to rotate in synchronism with the clutch cam 15, and the slider 24 and the pawl carried thereby are biased toward the kick lever by being guided by the guide rod 28 so as to cause the tip 25a of the pawl 25 to engage the tooth of the ratchet wheel at a position slightly displaced from the line a interconnecting the axis of the ratchet wheel and the center of rotation of the pawl. As a consequence, even when the tip of the pawl 25 collides upon the side surface of a tooth 4a of the ratchet wheel 4, due to the displacement described above, the pawl can readily swing in the clockwise direction without being arrested by the tip of the tooth 4a thereby accurating switching the states of torque transmission and interruption. Prevention of the arresting of the pawl tip can increase the number of teeth of the ratchet wheel than that of the prior art design. The present invention also enables the pawl to be disengaged from the ratchet wheel with a smaller angle of rotation of the handle thus improving the reliability of the fishing reel.

What is claimed is:

1. A clutch mechanism for a fishing reel comprising:
   a pinion;
   a cover member;
   means for mounting said pinion so as to be selectively reciprocated in an orthogonal direction relative to said cover member;
   a spool for retaining a fishing line;
   a spool shaft;
   means for rotatably mounting said spool and said spool shaft relative to said cover member;
   a clutch cam;
   an axis;
   means for rotatably mounting said clutch cam on said axis about said pinion;
   a clutch bar;
   means for reciprocatably mounting said clutch bar in a direction parallel to said pinion;
   a push button;
   means for pivotally mounting said push button relative to said cover member;
   means for operatively connecting said push button to said clutch cam for imparting rotary motion thereto;
   a kick lever having a first end;
   means for pivotally mounting said first end of said kick lever relative to said cover member;
   a pin being operatively mounted on said push button;
   a slot being positioned in a second end of said kick lever;
   a slot being positioned in said clutch cam;
   said pin of said push button being operatively mounted within said slot of said kick lever and said slot of said clutch cam to rotate said kick lever and said clutch cam when said push button is rotated;
a ratchet wheel;
an axis for rotatably mounting said ratchet wheel relative to said cover member;
a slider;
a pivot pin operatively mounted on said kick lever;
means for mounting said slider on said pivot pin;
a lug;
means for affixing said lug to said slider;
a kick pawl;
means for pivotally mounting said kick pawl on said slider at a predetermined angle and said kick pawl being operatively pivotally mounted to selectively engage said ratchet wheel;
spring means for normally biasing said kick pawl into engagement with said lug;
a guide rod;
means for securing said guide rod to said cover;
said slider being rotatable about said pivot pin while being in engagement with the periphery of said guide rod;
said kick pawl being selectively engageable with said ratchet wheel at a position slightly displaced from a line interconnecting said axis of said ratchet wheel and a center of rotation of said kick pawl when said push button is actuated and said clutch cam disengages said pinion from said spool shaft and said kick pawl being subsequently disengaged from said ratchet wheel by a subsequent slight rotation of said ratchet wheel.

2. The clutch mechanism according to claim 1, wherein said ratchet wheel includes a plurality of teeth, said kick pawl being adapted to rotate about said pivot mount on said slider to ensure positive engagement between said kick pawl and said ratchet teeth when said push button is actuated and said clutch cam disengages said pinion from said spool shaft.

3. The clutch mechanism according to claim 1, wherein said slider includes a second lug operatively positioned to normally engage said kick lever to limit rotation of said slider relative to said kick lever.

4. The clutch mechanism according to claim 1, and further including a stop pin for limiting the rotation of said push button with respect to said cover.

* * * * *